April 21, 1953 K. W. TANTLINGER 2,635,896
VEHICLE WHEEL SUSPENSION
Filed July 26, 1949 7 Sheets-Sheet 2
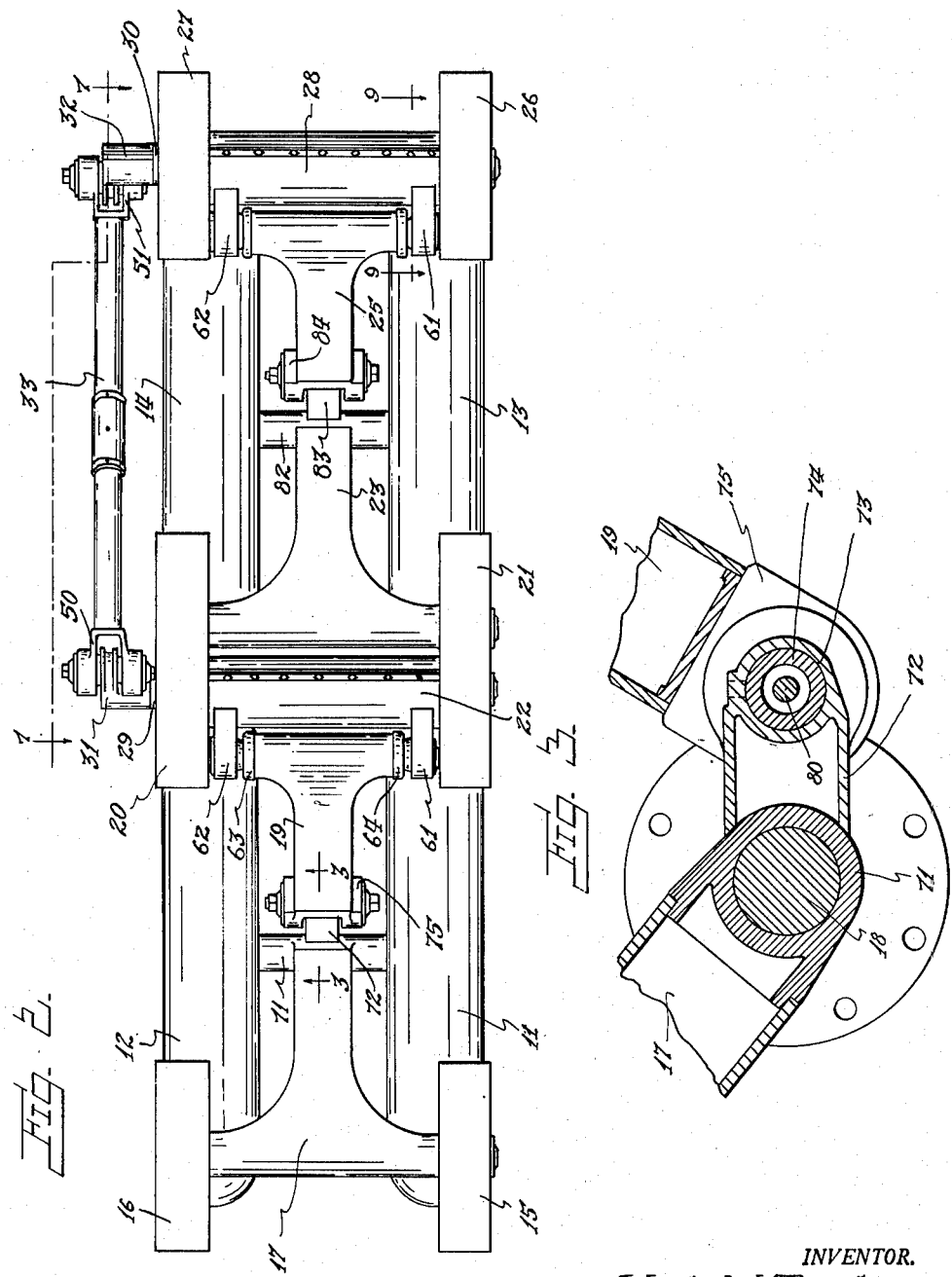
INVENTOR.
Keith W. Tantlinger
BY Gruk Wells
atty

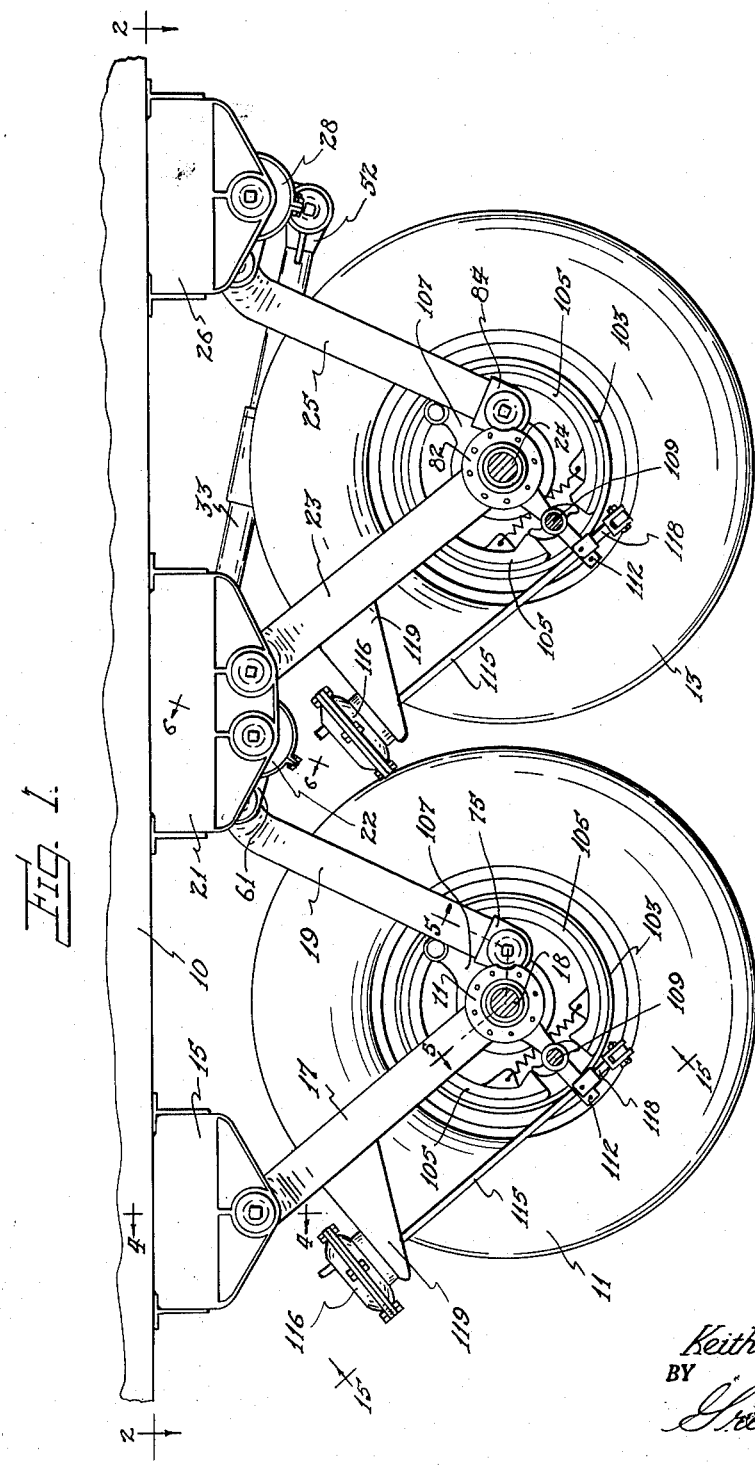

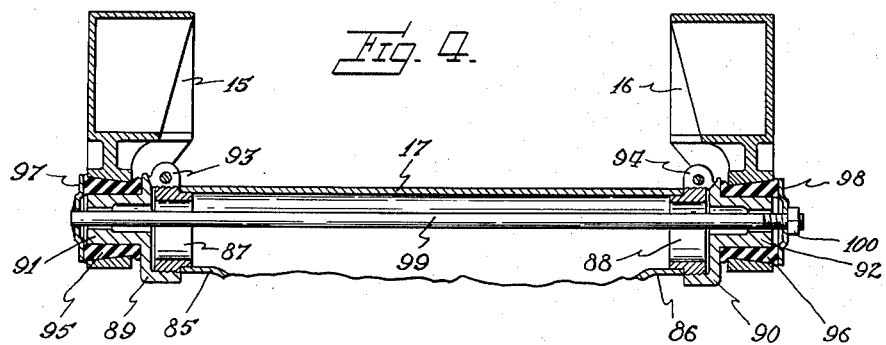
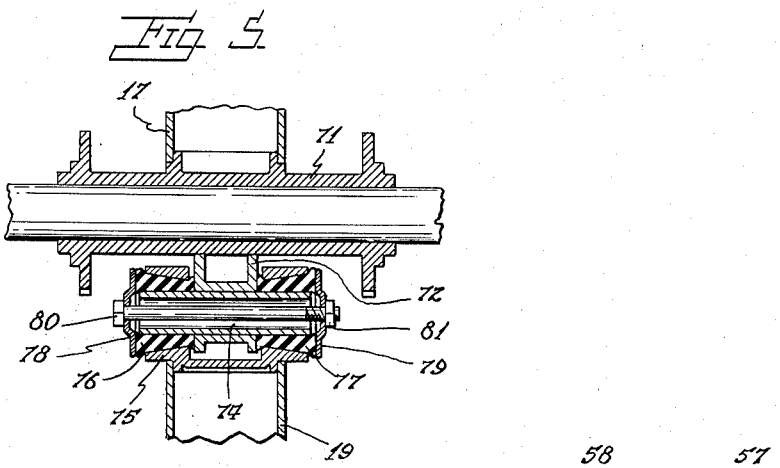
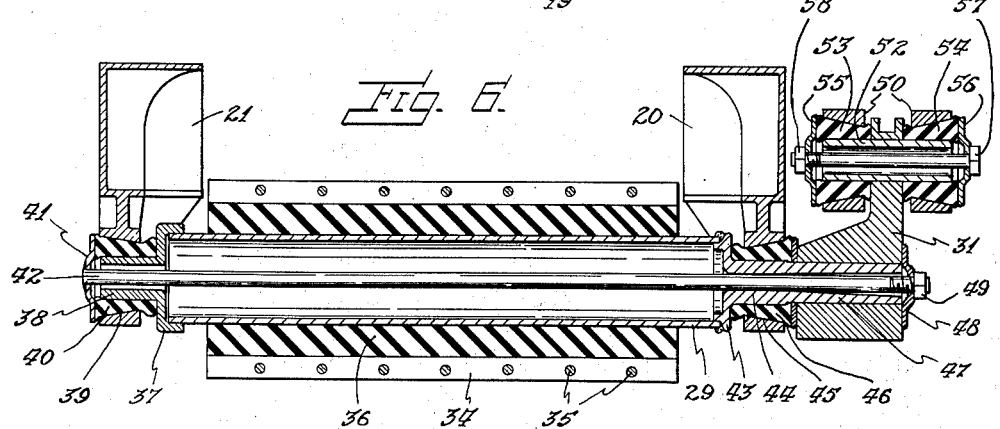

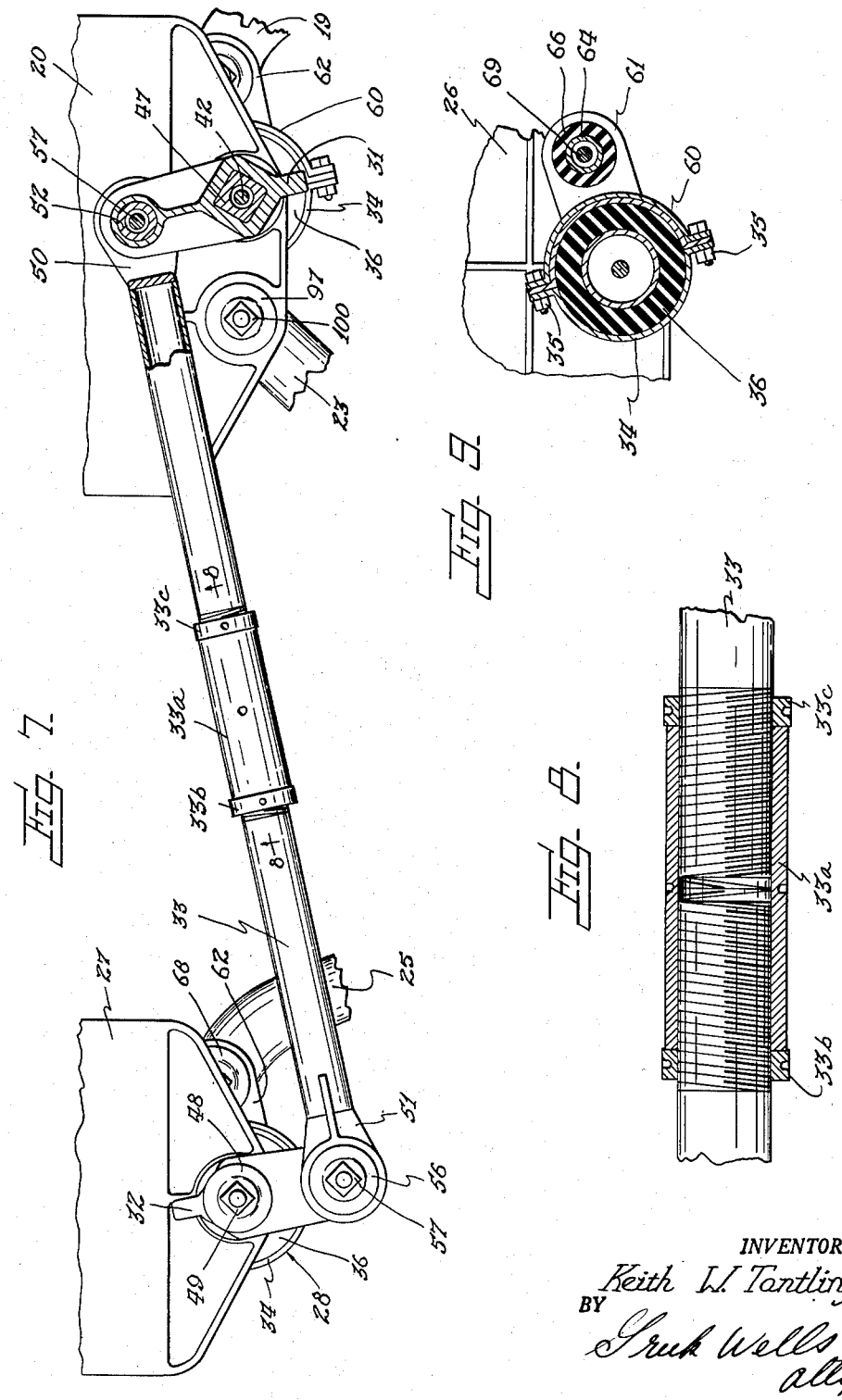

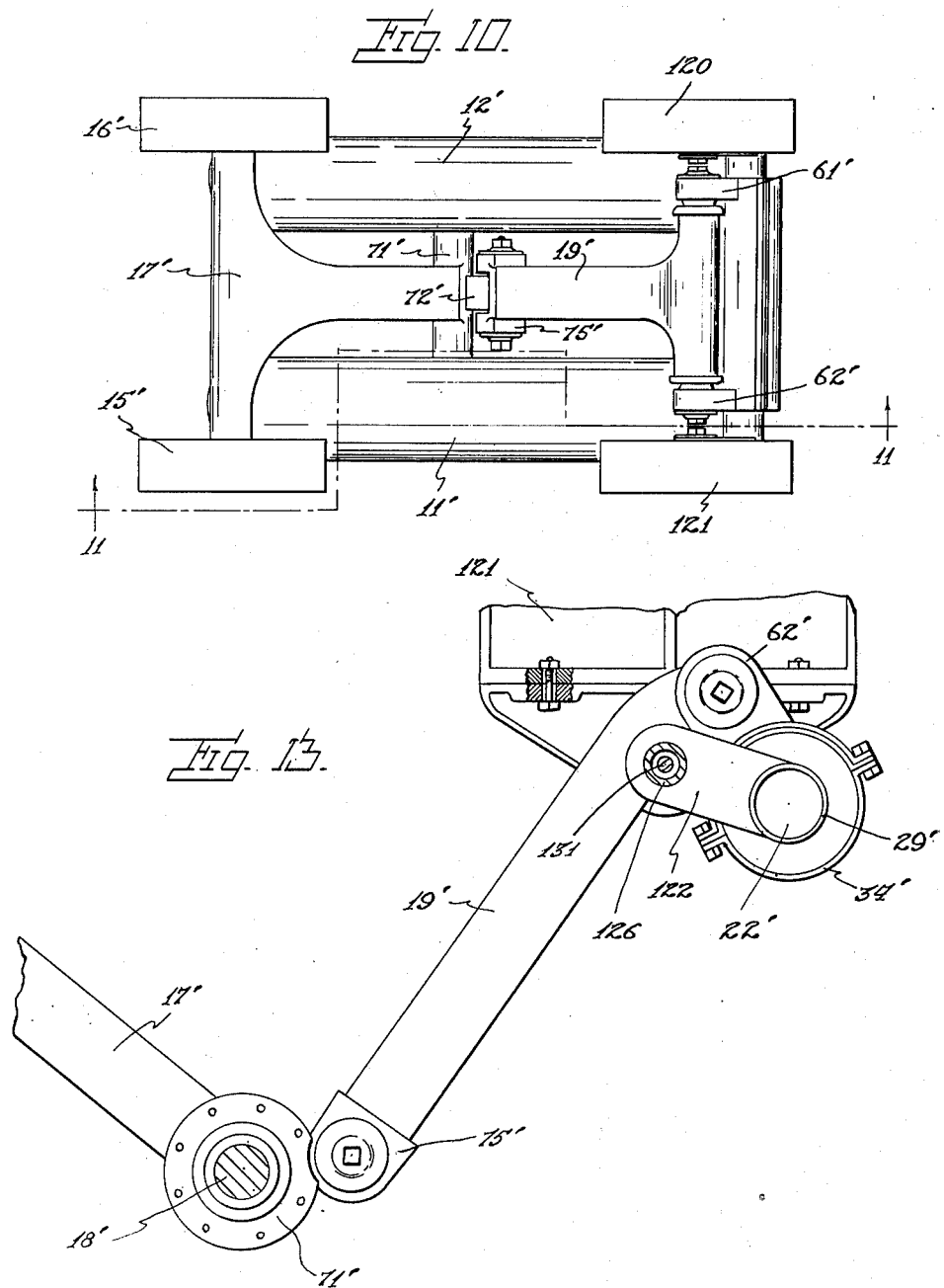

April 21, 1953 K. W. TANTLINGER 2,635,896
VEHICLE WHEEL SUSPENSION
Filed July 26, 1949 7 Sheets-Sheet 6
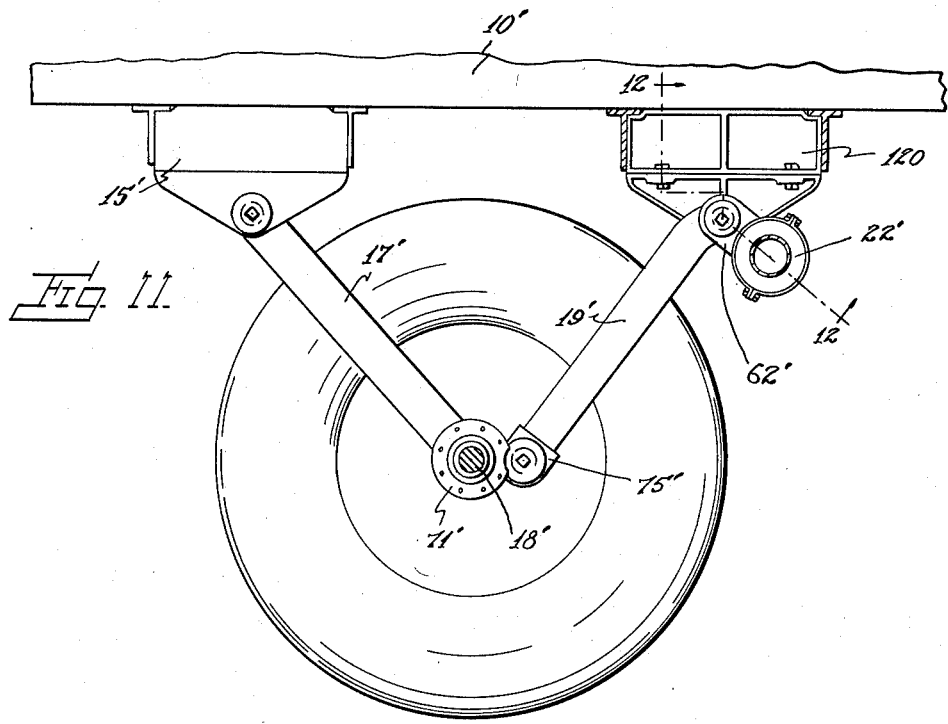
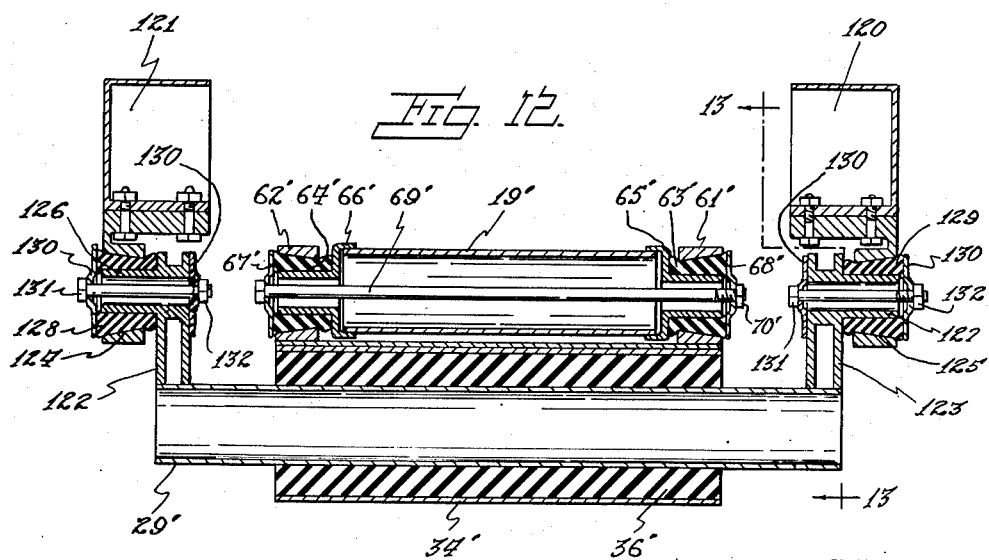
INVENTOR.
Keith W. Tantlinger
BY
Fred Wells
atty April 21, 1953  K. W. TANTLINGER  2,635,896
VEHICLE WHEEL SUSPENSION
Filed July 26, 1949  7 Sheets-Sheet 7
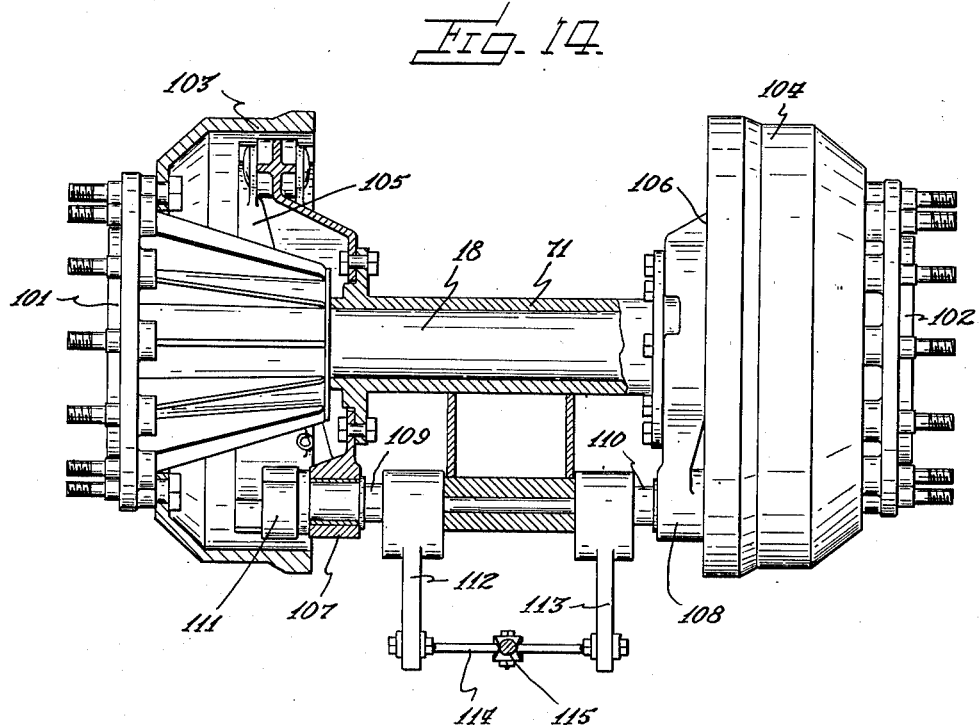
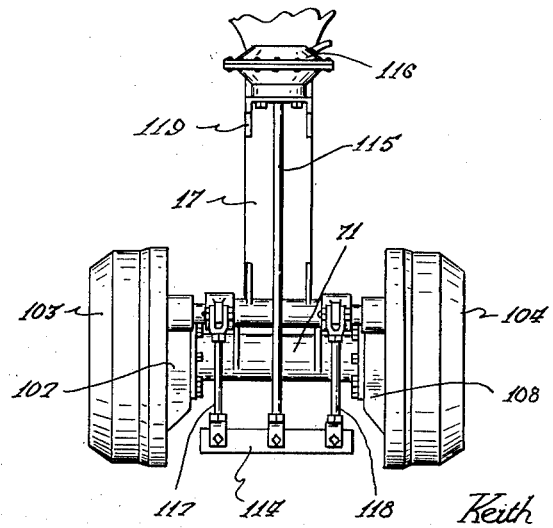
INVENTOR.
Keith W. Tantlinger
BY
Fred Wells
atty Patented Apr. 21, 1953

2,635,896

UNITED STATES PATENT OFFICE 2,635,896

VEHICLE WHEEL SUSPENSION

Keith W. Tantlinger, Spokane, Wash., assignor to Brown Trailers Inc., Spokane, Wash., a corporation of Washington Application July 26, 1949, Serial No. 106,871

6 Claims. (Cl. 280—104.5)

The present invention relates to improvements in a vehicle wheel suspension.

The principal purpose of my invention is to provide a means to spring support the vehicle from the wheels which is adapted to provide the minimum unsprung weight in combination with spring support mechanism for the load that varies in stiffness with load increase and decrease so as to provide soft riding over the range of loading from empty to capacity weight.

In all load bearing vehicles where the load is spring supported, the desired result is to provide a yieldability of the spring means that will give the optimum ease of ride or freedom from vibrations that are communicated through the wheels. In present known devices, the supports providing this ease at full load are too stiff at light load or no load. In particular this is important in large trucks and trailers making long hauls. One load may be quite heavy and tax the weight carrying capacity of the vehicle. The spring support for this condition must provide rigidity enough to keep the body from dropping so low as to cause contact with or difficulty with the running gear. On the return trip the same vehicle may carry a cargo which has more bulk but which has only a fraction of the weight of the first load. The more bulky and lighter products usually are more fragile and need the greatest protection from road shocks and vibration.

More specifically it is, therefore, a purpose of my invention to provide a wheel mounting for vehicles including a resilient element that is tensioned increasingly at an accelerating rate as the load is increased, with a minimum variation of elevation between wheel and load. To this end my invention contemplates an embodiment wherein a trailing arm, pivoted on the vehicle body, has the wheel at or near its free end, and a load strut is linked to the trailing arm to extend upwardly and away from the arm to the body. These are combined with one or more torsional springs connecting the load strut to the body in such fashion that increasing load on the wheel decreases the effective action of the load strut on the spring at an increasing rate.

It is a further object of this invention to provide in the aforesaid embodiment a wheel mounting that mounts the wheels individually on opposite sides of the trailing arm, with individual braking applicable to each wheel.

Another object of the invention is the provision of a novel connection, including the trailing arm and load strut, for establishing and maintaining proper camber and caster for the individual wheel units. The word camber, as used herein, refers to the inclination of the wheel with respect to the vertical. The word caster as used herein refers to the "toe in" or "toe out" of the wheel with respect to the line of travel of the vehicle.

Another object of the invention is the provision of a tandem arrangement of wheels with trailing arms and load struts and a compression strut with torsional springs, operable when the forward or rear member of the tandem drops suddenly into a depression to shift the other member and the spring loading to adapt the wheels to the changed terrain while maintaining optimum spring support of the load and minimum shift in elevation of the load.

Still another object of the invention is the provision of a torsional spring-to load strut-to body, connection, operable automatically to maintain the load strut thrust centered on a line through the body-to-spring connection, with the torsional spring moving about the body-to-spring connection, to accommodate for increasing and decreasing the loading of the spring by the end thrust of the load strut.

My improved wheel suspension is particularly advantageous in reducing the wear and heat on the tires. According to the construction when dual wheels are used the individual tires of a pair are spaced apart substantially and since each tire rolls independently there is no scuffing between the dual tires no matter what the condition of the roads or tires may be. The freedom from scuffing permits the tires to run much cooler and wide spacing also helps to cool the tires. The advantages of this construction are particularly noticeable in elimination of the dragging of one wheel by another in making a turn. A sharp turn will cause the outer wheel of a pair to make a complete revolution more than the inner wheel. This means that for each turn one tire must be skidded a distance equal to its circumference if the wheels are secured together. With my construction neither wheel causes the other to skid.

A further object of the present invention is to provide a wheel suspension mechanism for vehicles embodying means to mount two wheels side by side wherein the wheel bearings and tires are accessible with respect to either wheel for checking or removal by merely elevating the other wheel. The arrangement is such that the wheels of a pair are separated by the support arm and the compression strut to effect a relatively wide distribution of tire surface in contact with the roadway transversely of the vehicle. An additional feature and advantage in this respect is the utilization of the trailing support arm to provide brake connections to the individual wheels.

Another object of the invention is to provide a wheel suspension of the character described embodying the trailing arm and a compression strut with a torsional spring mounting for the compression strut together with means for varying the load height to accommodate varying loading levels encountered.

The foregoing objects and advantages together with additional objects of my invention will be described more fully hereinafter in the detailed description of a preferred embodiment of my invention shown in the accompanying drawings. It should be understood however, that the drawings and description are illustrative only and are not to be considered as limiting my invention except insofar as it is limited by the claims.

In the drawings:

Figure 1 is a view in side elevation of a wheel suspension embodying my invention;

Figure 2 is a plan view taken substantially on the line 2—2 of Figure 1 with the vehicle body left off, illustrating the wheel suspension mechanism as it appears when viewed from the top and utilizing dual wheels in tandem;

Figure 3 is an enlarged fragmentary sectional view taken on the line 3—3 of Figure 2;

Figure 4 is a sectional view taken on the line 4—4 of Figure 1;

Figure 5 is a sectional view taken on the line 5—5 of Figure 1;

Figure 6 is a sectional view taken on the line 6—6 of Figure 1;

Figure 7 is an enlarged fragmentary sectional view taken on the line 7—7 of Figure 2;

Figure 8 is an enlarged sectional view taken on the line 8—8 of Figure 7;

Figure 9 is a sectional view taken on the line 9—9 of Figure 2;

Figure 10 is a plan view similar to Figure 2 of the wheel suspension illustrating its construction when only a single pair of dual wheels is used at each side of the vehicle;

Figure 11 is a sectional view taken substantially as indicated on the line 11—11 of Figure 10;

Figure 12 is a sectional view taken on the line 12—12 of Figure 11;

Figure 13 is an enlarged fragmentary sectional view taken on the line 13—13 of Figure 12 illustrating a changed position;

Figure 14 is a plan view partly in section of the wheel axle and brake assembly utilized in mounting the wheels on the wheel arm; and Figure 15 is a fragmentary side view of the wheel mounting and wheel arm assembly taken substantially on the line 15—15 of Figure 1.

Referring now in detail to the drawings and particularly to Figures 1 to 9 inclusive, these figures will illustrate my invention as applied to a vehicle wheel suspension that utilizes four wheels as a unit, the wheels being arranged in front and rear pairs. The four wheels 11, 12, 13 and 14 are individually mounted so that each wheel can rotate independently of the others. Mounting brackets 15 and 16 at the forward end of the wheel assembly are secured to the vehicle body and mount a trailing wheel arm 17 which has a wheel axle 18 at its lower end for mounting the wheels 11 and 12. A load strut 19 is pivotally connected at its lower end to the wheel arm 17 so that the strut 19 is likewise supported by the axle 18 and the wheels 11 and 12.

A second pair of brackets 20 and 21 also mounted to the body 10 serves to mount a torsional spring assembly 22 and a second trailing wheel arm 23. The trailing wheel arm 23 has an axle 24 at its lower end on which the wheels 13 and 14 are mounted. A second load strut 25 is pivotally secured to the lower end of the trailing wheel arm 23.

A third pair of brackets 26 and 27 also mounted on the body 10 serves to mount a torsional spring assembly 28 for the load strut 25. The torsional spring assemblies 22 and 28 have their central tubes 29 and 30 linked together by lever arms 31 and 32 and a compression link 33 which can be adjusted in length.

The torsional spring assemblies 22 and 28 are of the same general construction. These spring assemblies provide the means by which the yielding support of the body 10 is accomplished. In order that the function of the remainder of the mechanism in combination with these assemblies will be more clearly understood, the detailed construction of the torsional spring assembly is given at this point.

Each torsional spring assembly is made up of two co-axial tubes (see Figures 6 and 9). The inner tube 29 extends beyond the outer tube 34. The outer tube 34 is made up of two half sections which have flanges that are secured together by welding and the flanges are apertured to receive a series of bolts 35. The yieldability of the torsional spring is provided by a rubber sleeve 36 that fills the space between the members 29 and 34 and is bonded directly to the metal of these members. This type of torsional spring construction is commonly referred to as a torsilastic spring. It will be appreciated that if the shell member 34 is rotated with respect to the tube 29, the rubber 36 will yieldingly oppose such rotation. A torsional spring of this construction is highly advantageous for my purpose since it can be made with adequate strength and size to carry the tremendous loads necessary in a heavy load carrying vehicle such as a large highway trailer that carries several tons. It provides a spring in which there is no rubbing of metal against metal and in which there are no parts to come loose.

The tube 29 is provided at one end with a pivot bushing 37 (see Figure 6) that has a reduced extension 38 extending into the bracket 21. The pivot bushing 37 is of course, permanently secured on the tube 29. The bracket 21 has a tapered aperture 39 which receives a tapered rubber bushing 40. The rubber bushing is under compression in the aperture 39. It is held by a cap plate 41 that is secured on the end of a rod 42 which extends through the tube 29. At the other end of the tube 29 a lever arm mounting member 43 is secured. This member has a cylinder portion 44 that extends through an aperture 45 in the bracket 20. A rubber bushing 46, identical with the bushing 40, is under compression in the aperture 45. The member 43 has a squared extension 47 that mounts the lever arm 31 which is provided with a hub portion that has a squared aperture. The lever arm 31, hereinafter sometimes referred to as a pitman arm is held on the portion 47 of the member 43 by a cap washer 48 and a nut 49.

The torsional spring assembly 28 is identical in construction to the assembly 22 so the description of one will suffice for both. It will be noted that the torsional springs are so mounted in the brackets that they can rotate since the bushings 40 and 46 will yield and permit whatever rotation is necessary. The tubes 29 and 30 however, are fixed with respect to the pitman arms 31 and 32. Yokes 50 and 51 at the opposite ends of the link 33 are connected to the arms 31 and 32 in the manner shown in Figure 6. A tube 52 and rubber bushings 53 and 54 provide the connection and are held in place by cap washers 55 and 56, a bolt 57 and a nut 58.

Each of the load struts 19 and 25 is connected to its respective torsional spring assembly 22 or 28 in the manner illustrated best by Figures 1, 2 and 9. A semi-cylindrical mounting plate 60 is bolted by the bolts 35 to the shell member 34 of the torsilastic spring assembly. This plate 60 has welded thereto a pair of short lever arms 61 and 62. The load strut has pivot bushings 63 and 64 extending into the arms 61 and 62 and mounted by rubber bushings 65 and 66 which are held in place by cap washers 67 and 68, a rod 69 and a nut 70. The details of this construction are illustrated in section in Figure 12 where the same construction is applied to a modified wheel suspension but does not employ wheels in tandem. With this construction it is believed to be evident that upward pressure of the load strut 19 will be communicated through the lever arms 61 and 62 to the shell member 34 and the rubber 36. This pressure will tend to rotate the tube 29 and thus transmit movement to the link 33 through the pitman arm 31 and the yoke 50.

The lower end of the load strut 19 is pivotally supported on the lower end of the trailing wheel arm 17 in the manner best illustrated by Figures 2, 3 and 5. The wheel arm 17 at its lower end is fixed to a sleeve 71 that has a mounting bracket 72 welded thereon and extending rearwardly from the sleeve 71. The bracket 72 has a bearing portion 73 that receives a mounting tube 74. The load strut 19 has a yoke 75 at its lower end that is mounted on the tube 74 and rubber bushings 76 and 77. Cap washers 78 and 79, a bolt 80 and a nut 81 secure the parts together and hold the bushings 76 and 77 under compression.

It is believed to be clear from the foregoing description that the weight of the body 10 will tend to swing the trailing arm 17 rearwardly and upwardly about its mounting to the brackets 15 and 16 and this will thrust the load strut 19 upwardly to transmit a turning movement to the outer shell member 34 of the spring assembly 22.

The load strut 25 is connected to the trailing wheel arm 23 by a sleeve 82, a bracket 83 and a yoke 84 in the same fashion that the trailing wheel arm 17 is connected to the load strut 19.

The trailing wheel arms 17 and 23 are connected to their respective body brackets in the same fashion. This connection is illustrated in Figure 4 of the drawings. The trailing arms are hollow and have lateral tubular extensions 85 and 86 at the upper ends. The extension 85 has a threaded bushing 87 fixed therein and the extension 86 has a threaded bushing 88 secured therein. An eccentric pivot member 89 is threaded on the bushing 87 and a like pivot member 90 is threaded on the bushing 88. These members 89 and 90 have pin portions 91 and 92 offset with respect to the axis of the bushings 87 and 88. The portions of the members 89 and 90 that are threaded on the bushings 87 and 88 are slotted and provided with ears as indicated at 93 and 94 so that they may be clamped in place when the pivot portions 91 and 92 are set at the desired position. The portions 91 and 92 are mounted in the brackets 15 and 16 respectively by rubber bushings 95 and 96, cap washers 97 and 98, a bolt 99 and a nut 100.

The eccentric pivot members 89 and 90 provide a means for correcting the alignment of the wheels secured to the trailing wheel arms. It will be appreciated that by proper adjustment of these pivot members, the extension 86 may be made to trail the extension 85 slightly to cause the wheels 11 and 12 to toe in. This adjustment is accomplished by setting the members 89 and 90 on their respective bushings 87 and 88 so that the pin portion 92 will be nearer the forward edge of the wheel arm 17 than the pin portion 91. The pivot members may also be adjusted to lower one extension with respect to the other so as to give the proper camber to the wheels. This is done by setting the members 89 and 90 on their respective bushings 87 and 88 so that the pin portion 91 is nearer the top of the wheel arm 17 than the pin portion 92. It is desirable to have the wheels toe in slightly and to have them tilted slightly to the vertical. The adjustment provided by the pivot members 89 and 90 and their connection to the trailing wheel arms takes care of this. The load struts 19 and 25 may be connected to their respective lever arms 61 and 62 by like eccentric pivot members if desired.

The position of the wheel arms 17 and 23 and the load struts 19 and 25, as illustrated in Figure 1, is that of light load or empty position. In this position the lever arms 61 and 62 that connect the load struts to the torsional spring assemblies 22 and 28 are substantially at right angles to the load struts. The increase of load causes a clockwise rotation of the lever arms 61 and 62 and this in turn reduces the effective length of the lever arms 61 and 62 as the levers tend to rotate the outer shell member 34 of the torsional spring. As the load increases the lever arms are more rapidly reduced in effective length. This is an important feature of the construction in providing for easy riding throughout the range of loading. It provides a maximum spring softness with no load and increased stiffening of the spring action as the load increases. In addition it provides a safety factor, because the leverage on the torsilastic spring decreases toward zero as the load increases, and in the event of spring failure or a break in the connecting link 33 or its connections to the members 29 and 30, the arms 61 and 62 become merely links connecting the upper ends of the load struts to the members 29 and 30.

The link 33 can be lengthened or shortened in the manner illustrated by Figures 7 and 8 to take care of various load conditions. If the sleeve 33a of the link 33 is rotated in such a manner as to lengthen the link 33, increased tension will be applied to the torsilastic springs. Lock nuts 33b and 33c are provided at the ends of the sleeve 33a for locking the sleeve in position.

Figures 1, 14 and 15 illustrate the individual mounting of the several wheels and the manner in which the brakes are operated. The axle 18 rotatably mounts two wheel hubs 101 and 102. These hubs carry the usual brake drums 103 and 104 in which the brake shoes 105 and 106 operate, thus each wheel is free to rotate on the axle 18 and is controlled by its own individual brake shoe. The brake operating mechanism includes spiders 107 and 108 that carry the brake shoes. These spiders are mounted on the sleeve 71 that is secured to the end of the trailing wheel arm. Cam shafts 109 and 110 are mounted on the spiders and carry spreading cams, one of which is shown at 111, Figure 14, for spreading the brake shoes. The cam shafts 109 and 110 have levers 112 and 113 secured thereto. These levers are operated by a cross head 114 and a brake rod 115 that lead to an air diaphragm 116. The connections from the levers 112 and 113 to the cross head 114 is by means of links 117 and 118. A bracket 119 on the wheel arm supports the brake rod 115 and its air diaphragm 116.

Referring now to Figures 10, 11, 12 and 13, these figures illustrate my invention as applied to the support of a vehicle body 10' by dual wheels 11' and 12'. The brackets 15' and 16' mount a trailing wheel arm 17' in the same fashion as in the main form of the invention. For the sake of clarity none of the brake mechanism is shown in connection with the modification. A load strut 19' is connected to the wheel arm 17', a bracket 72' and a yoke 75' in the same manner as in the main form of the invention. The wheel axle 18' and the wheels are mounted in the same fashion as in the main form of the invention. In connecting the load strut 19' to the torsional spring unit 22' the construction is however, slightly different from that shown in the main form of the invention. Brackets 120 and 121 are secured to the vehicle body 10' and serve to mount the torsional spring assembly 22' in the manner illustrated in Figure 12. These brackets are desirably made of two sections bolted together with provision, as indicated in Figure 13, for a limited amount of adjustment of the lower section with respect to the upper section. The central member 29' of the torsional spring has lever arms 122 and 123 at its ends. These lever arms are secured in tapered bearings 124 and 125 on the brackets 121 and 120 by pin portions 126 and 127 on the lever arms 122 and 123 and rubber bushings 128 and 129. The bushings 128 and 129 are held under compression by cap washers 130, bolts 131 and nuts 132. The connection of the load strut 19' to the outer member 34' of the torsilastic spring unit 22' is identical with that in the main form of the invention.

In this modified form of the invention, the spring 22' is free to move about the mountings in the brackets 120 and 121 when load is applied thereto through the load strut 19'. This is illustrated by comparing Figures 11 and 13. In Figure 11, for example, the arms 122 and 123 are in direct alignment with the lever arms 61' and 62'. In Figure 13, the load has moved the load strut 19' upward, this has caused a corresponding upward shift of the spring and the lever arms 61' and 62'. At the same time the load has caused a rotation of the shell portion 34' and the spring 22'. Further upward movement of the load strut 19' increases the turning movement of the outer shell 34' with respect to the tube 29' and at the same time shortens the effective leverage of the lever arms 61' and 62', 122 and 123.

It should be noted that through the construction described herein all of the pivotal connections are made by means of tapered rubber bushings so as to eliminate the necessity for oiling and to avoid bearings that wear and become loose. These tapered rubber bushings in addition, provide a certain amount of cushion against road shocks and thus greatly lengthen the life of the device. All of the weight of the vehicle is spring mounted, the only parts not so mounted being the wheels, the trailing arms and the load struts. This is in itself of great importance in eliminating wear and tear due to minor road shocks that are always present. The manner of mounting the wheel arms and load struts provides a considerable degree of flexibility for the wheel units. One wheel of a pair may ride over a bump with little strain on the mechanism because the rubber bushings permit the necessary yield. In the tandem construction, if the front wheels are elevated or dropped suddenly, the torsional spring mounting and the connecting link 33 reduce the shock by automatically causing the rear wheel to be placed under a greater spring pressure from the torsional spring. The individual wheel mounting is of great advantage in eliminating tire wear on curves. The outer wheels merely roll faster than the inner wheels and there is no dragging or skidding as a result.

It is believed that the nature and advantages of my invention will be clear from the foregoing description. Having thus described my invention, I claim:

1. In combination with a vehicle body a wheel arm pivoted on the body and extending downwardly at an acute angle to the body, a wheel supporting the lower end of the arm, a load strut also supported by said wheel and extending upwardly and away from the wheel arm toward the body, a lever arm pivoted on the other end of the load strut and extending angularly downward and away from the load strut, a second lever arm pivoted on the body, and means, including a spring under tension, connecting the free ends of said lever arms.

2. In combination with a vehicle body a pair of wheels spaced apart in tandem, a trailing wheel arm supported on each wheel having its upper end pivotally mounted to the body, a load strut supported by each wheel and pivotally connected to the corresponding wheel arm, a torsional spring mounted on the body adjacent the upper end of each load strut, means connecting one end of each spring to the upper end of its adjacent load strut, and a link under compression between the other ends of the two torsional springs to balance the loading of the springs.

3. In combination with a vehicle body a pair of wheels spaced apart in tandem, a trailing wheel arm supported on each wheel having its upper end pivotally mounted to the body, a load strut supported by each wheel and pivotally connected to the corresponding wheel arm, a torsional spring mounted on the body adjacent the upper end of each load strut, means connecting one end of each spring to the upper end of its adjacent load strut, and an extensible link under compression between the other ends of the two torsional springs to balance the loading of the springs.

4. In a wheel suspension for a vehicle body, a trailing wheel arm having means at its lower trailing end to mount a wheel, said arm having lateral extensions at its upper end for mounting the arm to the body, spaced bearing brackets on the body adapted to support said lateral extensions, said wheel mounting means comprising an axle, two wheels rotatably mounted on said axle with the trailing arm between them, a load strut extending upwardly from the wheel mounting end of the trailing arm, and a torsional spring connecting the upper end of the load strut to the body.

5. In a wheel suspension for a vehicle body, a trailing wheel arm having means at its lower trailing end to mount a wheel, said arm having lateral extensions at its upper end for mounting the arm to the body, spaced bearing brackets on the body adapted to support said lateral extensions, said wheel mounting means comprising an axle, two wheels rotatably mounted on said axle with the trailing arm between them, braking mechanism for said wheels mounted on the trailing wheel arm, a load strut extending upwardly from the wheel mounting end of the trailing arm, and a torisonal spring connecting the upper end of the load strut to the body.

6. In a wheel suspension for a vehicle body, the combination of a trailing wheel arm and a load strut pivoted together at their lower ends and diverging upwardly toward the vehicle body and connected thereto, means supporting the lower ends of the wheel arm and load strut comprising two separately rotatable wheels and axle means therefor, the load strut being connected to the body by a lever arm pivoted to the upper end of the strut and extending downwardly and rearwardly away from the strut and a torsional spring connected to the lever arm and to the body and urging the lever arm in a direction to push the load strut forwardly endwise toward the trailing arm.

KEITH W. TANTLINGER.

References Cited in the file of this patent

UNITED STATES PATENTS

| Number | Name | Date |
|---|---|---|
| 1,679,840 | Seymour | Aug. 7, 1928 |
| 1,753,420 | Johnson | Apr. 8, 1930 |
| 1,803,055 | Causan | Apr. 28, 1931 |
| 1,972,014 | Fraser | Aug. 28, 1934 |
| 2,154,569 | Hicks | Apr. 18, 1939 |
| 2,173,973 | Leighton | Sept. 26, 1939 |
| 2,220,916 | Schiff | Nov. 12, 1940 |
| 2,226,047 | Borgward | Dec. 24, 1940 |
| 2,226,406 | Krotz | Dec. 24, 1940 |
| 2,410,747 | Reid | Nov. 5, 1946 |
| 2,493,022 | Pointer | Jan. 3, 1950 |